United States Patent
Samba et al.

(10) Patent No.: US 12,063,166 B1
(45) Date of Patent: Aug. 13, 2024

(54) RESOURCE MANAGEMENT FOR SERVICES

(71) Applicant: Amazon Technologies, Inc., Seattle, WA (US)

(72) Inventors: Tejaswini Durga Samba, Herndon, VA (US); Neel Harishbhai Patel, Herndon, VA (US); Te Sun, Falls Church, VA (US); Gary Rittinger, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 95 days.

(21) Appl. No.: 17/709,265

(22) Filed: Mar. 30, 2022

(51) Int. Cl.
*H04L 47/80* (2022.01)
*H04L 9/40* (2022.01)
*H04L 47/78* (2022.01)

(52) U.S. Cl.
CPC .......... *H04L 47/808* (2013.01); *H04L 47/781* (2013.01); *H04L 63/102* (2013.01); *H04L 63/1416* (2013.01); *H04L 63/20* (2013.01)

(58) Field of Classification Search
CPC ..... H04L 47/808; H04L 47/781; H04L 63/20; H04L 63/1416; H04L 63/102
See application file for complete search history.

(56) References Cited

U.S. PATENT DOCUMENTS

| | | | | |
|---|---|---|---|---|
| 6,081,900 A * | 6/2000 | Subramaniam | ..... | H04L 63/0807 713/153 |
| 8,543,726 B1 * | 9/2013 | Kann | ................. | H04L 63/0281 709/219 |
| 2003/0097574 A1 * | 5/2003 | Upton | .................. | G06Q 10/103 713/183 |
| 2017/0228559 A1 * | 8/2017 | Jackson | .............. | G06F 21/6245 |
| 2018/0069702 A1 * | 3/2018 | Ayyadevara | ........ | H04W 12/069 |
| 2020/0067811 A1 * | 2/2020 | Shah | ...................... | H04L 41/145 |
| 2020/0099614 A1 * | 3/2020 | Vutharkar | ................ | G06F 7/14 |
| 2021/0306303 A1 * | 9/2021 | Lewin | ................... | H04L 63/083 |
| 2021/0409421 A1 * | 12/2021 | Dayan | .................. | H04L 63/105 |
| 2022/0012037 A1 * | 1/2022 | Palanisamy | .......... | G06F 3/0619 |
| 2022/0215101 A1 * | 7/2022 | Rioux | ................... | G06F 21/577 |
| 2023/0141909 A1 * | 5/2023 | Truscott | ................. | H04L 63/02 726/23 |

* cited by examiner

*Primary Examiner* — Jungwon Chang
(74) *Attorney, Agent, or Firm* — BakerHostetler

(57) ABSTRACT

Systems and methods for resource management are disclosed. A search request may be received at a resource management service of a provider network. The search request may be received from a client device that does not have permission to access resources in a protected region of a provider network. The search request may specify a query associated with at least one operational health indicator in the protected region. It may be determined, using a secure query service, that the at least one operational health indicator does not exist in the protected region. The secure query service enables the client device to obtain information about the resources in the protected region without gaining access to the resources in the protected region. Sending of a notification indicating that the at least one operational health indicator does not exist in the protected region to the client device may be caused.

20 Claims, 9 Drawing Sheets

RESOURCE MANAGEMENT FOR SERVICES

BACKGROUND

A provider network comprises a variety of types of computing-related resources and/or internal services for executing a variety of tasks on behalf of a user. Such tasks can include, for instance, executing code (e.g., an application/user function) on behalf of the customer, executing queries for the user, and the like. For example, a user (i.e., a "service owner") may utilize the provider network to implement one or more services, such as a payment service. It is important that the operational health of these services be maintained. However, monitoring the operational health of these services and remedying any identified issues with the operational health of these services can be difficult or inefficient.

BRIEF DESCRIPTION OF THE DRAWINGS

The detailed description is set forth below with reference to the accompanying figures. The use of the same reference numbers in different figures indicates similar or identical items. The systems depicted in the accompanying figures are not to scale and components within the figures may be depicted not to scale with each other.

DETAILED DESCRIPTION

Figure 1:
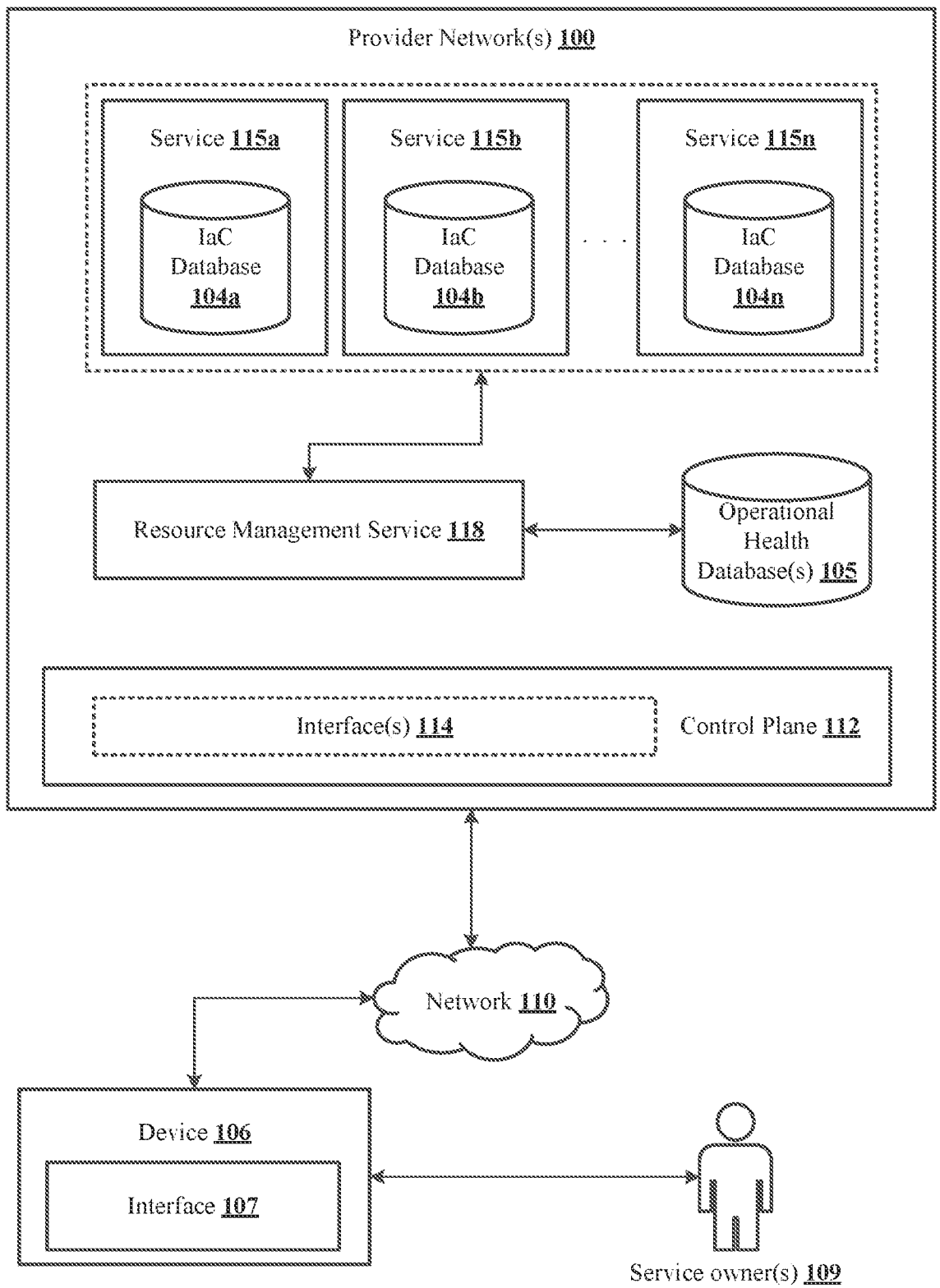
FIG. 1 is a diagram illustrating an example framework for managing resources of services implemented by a provider network.

Various embodiments for a framework for managing resources of services implemented by a provider network are described. Certain implementations and embodiments of the disclosure are described more fully below with reference to the accompanying figures, in which various aspects are shown. However, the various aspects may be implemented in many different forms and should not be construed as limited to the specific implementations described herein. The disclosure encompasses variations of the described embodiments.

Service owners may want to be made aware of any issues with the operational health of their service(s). For example, service owners may want to be made aware of any issues with their service's connectivity, front-end load balancers, data sources, latency, etc. To ensure that such issues are brought to their attention, service owners can set up metrics that track or monitor data related to operational health issues. For example, service owners can set up metrics that track or monitor their service's connectivity, front-end load balancers, data sources, latency, etc. over time.

The service owners can additionally set up alarms. An alarm is a preset condition measuring the data being tracked/monitored. For example, alarms may be used to provide notification to the service owners when one or more specified criteria associated with the tracked data are satisfied or are not satisfied. Such metrics and/or alarms may be set up when a service is initially built. However, over time as a service owner delivers a service, the service owner may find that there are additional or better metrics and/or alarms that should be added. The service owner may additionally, or alternatively, find that there are missing metrics and/or alarms.

According to some embodiments, a resource management service can enable service owners to better monitor the operational health of their services by automatically detecting missing metrics and/or alarms associated with services. As used herein, a "missing metric" includes a metric that should have been set up after a service was built but was not and a metric that is recommended that the service include to ensure the operational health of the service that became available after the service had already been being delivered. A "missing metric" may also refer to a metric that is suggested, recommended, or perhaps necessary to ensure the operational health of the service. Likewise, as used herein, a "missing alarm" includes an alarm that should have been set up after a service was built but was not and an alarm that is recommended that the service include to ensure the operational health of the service but that became available after the service has already been being delivered. A "missing alarm" may also refer to an alarm that is suggested, recommended, or necessary to ensure the operational health of the service.

Service owners may also, if desired, give permission to the resource management service to automatically repair any detected missing metrics and/or alarms. Previously, such missing metrics and/or alarms would have to be manually detected and manually repaired. Such a manual detection and repair process is costly, inefficient, and difficult. As a result, missing metrics and/or alarms previously went undetected for long periods of time and the operational health of services suffered.

FIG. 1 is a diagram illustrating a framework for resource management of services, according to some embodiments. In certain embodiments, a resource management service 118 provides a framework for detecting and/or repairing missing metrics and/or alarms associated with services 115a-n implemented on various devices, hosts and/or accounts in a provider network 100. In FIG. 1, the resource management service 118 is shown as part of a provider network 100, though in other embodiments the resource management service 118 may be implemented outside of the provider network 100, such as within a private or "on premise" network environment of an organization.

The provider network 100 provides service owners 109 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as internal services, such as a hardware virtualization service that can execute compute instances, a storage service that can store data objects, and/or a serverless execution service that can execute code (e.g., a program) on behalf of the customers.

To provide these and other computing resources, provider network 100 often relies upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a service owner 109 may directly utilize a compute instance hosted by the provider network 100 to perform a variety of computing tasks or may indirectly utilize a compute instance by submitting code to be executed by the provider network 100, which in turn utilizes a compute instance to execute the code (typically without the user having any control of or knowledge of the underlying compute instance(s) involved).

In some embodiments, the provider network 100 may comprise one or more resources. The resources may comprise, for instance, computation and storage resources utilized by applications and/or services 115a-n implemented on various devices/hosts. For example, the service owners 109 may utilize one or more of the variety of types of computing-related resources provided by the provider network 100 to provide services 115a-n to customers of the service owners 109. The services 115a-n may be any type of service. For example, the service 115a may be a payment service. In certain embodiments, each of the services 115a-n is associated with an infrastructure as code (IaC) database 104a-n. Each IaC database 104a-n can store a template comprising the resource metadata (i.e., the definition of resources) associated with the corresponding service 115a-n. The code may be organized as discrete definitions for each infrastructure component. The provider network 100 can execute the instructions to rapidly provision, configure, and deploy instances of a virtual computing resource.

As described above, to ensure the operational health of services, service owners 109 can set up metrics that track or monitor data related to operational health issues. For example, service owners can set up metrics that track or monitor their service's connectivity, front-end load balancers, data sources, latency, etc. over time. Additionally, to ensure that operational health issues are brought to their attention, the service owners 109 can set up alarms that may be used to provide notification to the service owners 109 when one or more specified criteria or conditions associated with the tracked/monitored data are satisfied or are not satisfied. For example, the service owner(s) 109 associated with the service 115a-n can set up alarms to provide notification when one or more specified criteria associated with the data being tracked or monitored by the metrics are satisfied or are not satisfied. For example, the alarms may indicate issues with service 115a's connectivity, front-end load balancers, data sources, latency, etc. Such metrics and/or alarms may be indicated in the IaC databases 104a-n. For example, the metrics and/or alarms associated with the service 115a may be stored in or defined in the IaC database 104a, the metrics and/or alarms associated with the service 115b may be stored in or defined in the IaC database 104b, etc.

The service owner 109 associated with a particular service 115a-n may be an individual or a team of individuals associated with a particular service account in the provider network 100. The services 115a-n may be deployed in such service accounts. The service owners 109 can utilize such service accounts to interact with the provider network 100 across one or more intermediate networks 110 (e.g., the internet) via one or more interface(s) 114, such as through use of application programming interface (API) calls, via a console implemented as a website or application, etc. The interface(s) 114 may be part of, or serve as a front-end to, a control plane 112 of the provider network 100 that includes "backend" services supporting and enabling the services that may be more directly offered to customers.

In certain embodiments, the provider network 100 provides the resource management service 118 for detecting missing metrics and/or alarms associated with the services 115a-n. In certain embodiments, the resource management service 118 comprises one or more components that may be implemented as software, hardware, or a combination of both using one or more multiple computing devices located at one or more multiple locations in the provider network 100.

In certain embodiments, the service owners 109 can onboard one or more of the services 115a-n to the resource management service 118. For example, a service owner 109 associated with the service 115a may utilize a user interface (UI) 107 of an electronic device 106 to request that the service 115a and/or the service account in which the service 115a is deployed be onboarded to the resource management service 118. The electronic device 106 can be, for example, a laptop, although the electronic device 106 can be any type of device, such as a desktop computer, a portable computing device, a smart phone, a tablet, etc.

In certain embodiments, if a service owner 109 requests that a service 115a-n and/or the service account(s) in which the services 115a-n are deployed be onboarded to the resource management service 118, the resource management service 118 may gain permission to read the resources associated with the service 115a-n and/or service account.

In certain embodiments, during the onboarding process of a service 115a-n, the resource management service 118 may parse the resources in the corresponding IaC database 104a-n to identify all resources related to the service 115a-n. The resource management service 118 may then identify if the service 115a-n has any metrics and/or alarms associated with the identified resources. For example, the resource management service 118 may verify whether each metrics and/or alarm stored in the IaC database 104a-n actually exists in the cloud stack. If a metric and/or alarm does not exist, the resource management service 118 may identify this metric and/or alarm as a missing metric and/or alarm. The resource management service 118 may notify the service owner 109, such as via the UI 107 or via any other interface or device, of the missing metric and/or alarm.

In certain embodiments, during the onboarding process of a service 115a-n, the resource management service 118 may parse through metric and/or alarm patterns stored in one or more operational health databases 105. The patterns may indicate a predefined list of metrics and/or alarms that a particular type or category of service should have in order to maintain operational health. For example, the resource management service 118 may determine the metric and/or alarm patterns for various types or categories of services (such as payment services, etc.) based on parameters associated with certain types of accounts. The resource management service 118 may determine whether the service 115*a*-*n* includes all of the predefined metrics and/or alarms indicated by the patterns. If not, the resource management service 118 may identify this metric or alarm as a missing metric or alarm. The resource management service 118 may notify the service owner 109, such as via the UI 107 or via any other interface or device, of the missing metric(s) and/or alarm(s).

In certain embodiments, the resource management service 118 may determine whether the service 115*a*-*n* includes all of the predefined metrics and/or alarms indicated by the patterns. For example, the resource management service 118 may determine that a service 115*a*-*n* does not include a particular metric and/or alarm indicated by the pattern(s), and the service 115*a*-*n* may determine a recommendation level associated with this particular metric or alarm (i.e., necessary alarm, highly recommended alarm, moderately recommended alarm, suggested alarm, etc.). The resource management service 118 may notify the service owner 109, such as via the UI 107 or via any other interface or device, of the missing metric and/or alarm and the associated recommendation level.

In certain embodiments, the resource management service 118 may create missing metrics and/or alarms for the service owners 109. For example, during the onboarding process, the service owners 109 may be able to give the resource management service 118 permission to create metrics and/or alarms on their behalf. If the resource management service 118 detects a missing metric and/or alarm and the resource management service 118 has permission to create metrics and/or alarms, the resource management service 118 may automatically create the missing metrics and/or alarms. If the resource management service 118 is not given permission to create metrics and/or alarms on behalf of the service owners 109, the resource management service 118 may give the service owners 109 the code to create the metrics and/or alarms (thus, with one click, the metric and/or alarm can be created).

In certain embodiments, service owners 109 only need to onboard a service 115*a*-*n* and/or service account to the resource management service 118 once. If the IaC associated with an already onboarded service 115*a*-*n* is updated sometime in the future, the above-described process of detecting and/or creating any missing metrics and/or alarms may automatically repeat itself. For example, if the IaC associated with the service 115*a*-*n* is updated three months after onboarding, the resource management service 118 may, at the time of the IaC update, check for missing metrics and/or alarms. If the resource management service 118 has permission to create metrics and/or alarms, the resource management service 118 may, at the time of the IaC update, create the missing metrics and/or alarms. The resource management service 118 may notify the service owner 109, such as via the UI 107 or via any other interface or device, of any missing metrics and/or alarms each time the IaC is updated.

Figure 2:
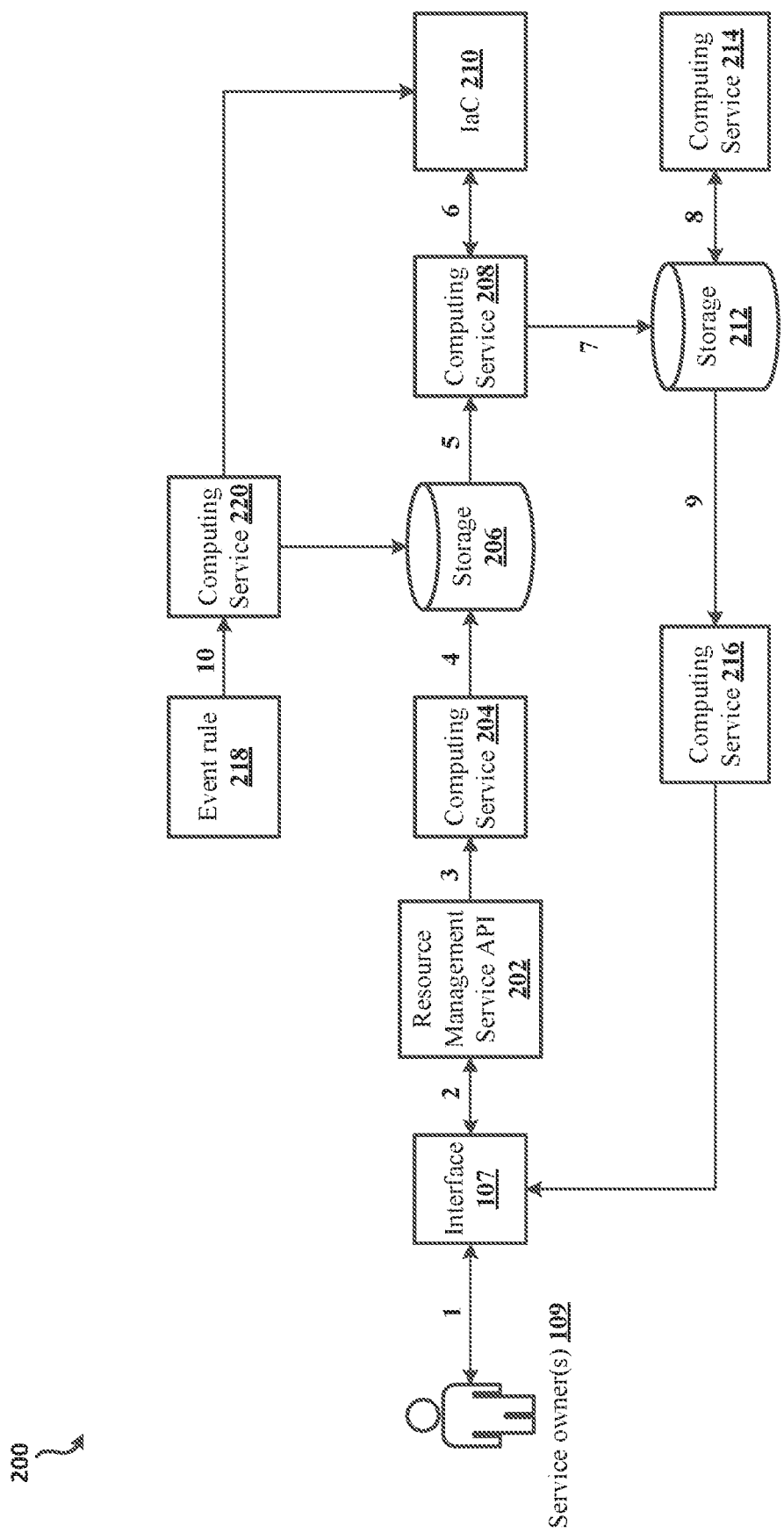
FIG. 2 is a diagram illustrating implementation of a resource management service.

FIG. 2 is a diagram illustrating implementation of a resource management service, such as the resource management service 118 of FIG. 1. A service owner 109 may want to onboard a service (i.e., one of services 115*a*-*n*) to the resource management service. To do so, the service owner 109 can utilize the UI 107 and/or a resource management service application programming interface (API) 201 directly. The service owner 109 can utilize the UI 107 and/or the API 201 to request that their service and/or their service account be onboarded to the API 201. Once this request is received by the API 201, the computing service 204 can write the account details associated with the service account into a table in storage 206. Storage 206 may be used for storing onboarding data specifically.

In certain embodiments, once the request is in the onboarding table in storage 206, a resource parsing computing service 208 may be initiated. The computing service 208 can may parse the resources in the IaC 210 associated with the service to identify all resources related to the service. The computing service 208 can, based on parsing the resources in the IaC 210, identify if the service has any metrics and/or alarms associated with those resources. The computing service 208 takes this metric and/or alarm information and inserts it into a resource status tracking table in a storage 212.

In certain embodiments, once the metric and/or alarm information is inserted into the resource status tracking table in a storage 212, the storage 212 calls the detection computing service 214. The detection computing service 214 verifies if metrics and/or alarms indicated in the IaC 210 actually exists in the cloud stack. If one or more metrics and/or alarms do not exist, the detection computing service 214 can identify that these metrics and/or alarms do not exist in the resource status tracking table in the storage 212. Additionally, the detection computing service 214 can parse through metric and/or alarm patterns to see if the service has the pre-defined metrics and/or alarms that have been identified as important (i.e., necessary or recommended) for their service's operational health. If one or more of these pre-defined metrics and/or alarms do not exist in the IaC 210, the detection computing service 214 can identify that these pre-defined metrics or alarms do not exist in the resource status tracking table in the storage 212. In certain embodiments, the notification computing service 216 may notify the service owner 109, such as via the UI 107 or via any other interface or device, of any missing metrics and/or alarms identified in the resource status tracking table in the storage 212.

In certain embodiments, once a missing metric and/or alarm is identified in the resource status tracking table in the storage 212, the resource management service 118 may generate the code to create the metrics and/or alarms. For example, the resource management service 118 may generate the code to create the metrics and/or alarms if the service owner 109 has not given the resource management service 118 permission to create such metrics and/or alarms. The code may be sent to the service owner 109 via the UI 107. Thus, the service owner 109 can easily create the necessary or recommended metrics and/or alarms.

As described above with regard to FIG. 1, service owners 109 may only need to onboard a service and/or service account to the resource management service 118 once. An event rule 218 may automatically trigger periodically. For example, the event rule 218 may trigger once per hour, once per day, once per week, etc. The event rule 218 may, each time it is triggered, cause a stack change computing service 220 to determine if changes or updates have been made to the IaC 210 associated with the onboarded service. If the computing service 220 determines that the IaC 210 has been updated or changed, the computing service 220 may update the onboarding table in the storage 206 with the last updated date and the above-described process of detecting and/or creating any missing metrics and/or alarms may automatically repeat itself.

In certain embodiments, one or more of the computing service 204, the computing service 208, the computing service 216, the computing service 214, and the computing service 220 may be implemented using one or more serverless functions executed by an on-demand code execution service. Serverless functions may be maintained within the provider network and may be associated with a particular user or account or may be generally accessible to multiple users and/or multiple accounts. Each serverless function may be associated with a URL, URI, or other reference, which may be used to call the serverless function. Each serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network. In some embodiments, these resources may be maintained in a "ready" state (e.g., having a pre-initialized runtime environment configured to execute the serverless functions), allowing the serverless functions to be executed in near real-time.

In certain embodiments, a provider network provides protected (i.e., private, restricted, high side) regions to some customers who require a higher security environment in which to operate. Such protected regions may include, for example, sensitive public sector dedicated clouds. A protected region of the provider network may include a set of computing resources that are air-gapped (e.g., resources that do not have internet connectivity or otherwise cannot communicate readily with resources in at least one other region of the provider network and/or resources external to the provider network).

A resource management service can enable users who otherwise do not have clearance to access resources in a protected region of a provider network to monitor the operational health of services implemented in the protected region. Such users who do not have clearance to access resources in a protected region of a provider network are herein referred to as "low-side" users. For example, the resource management service can pass metrics and aggregated and anonymized data for sensitive public sector dedicated clouds from the high side to unprotected (i.e., low side, commercial, unrestricted) regions. Thus, the resource management service can enable low-side users to determine if there are missing metrics and/or alarms associated with services implemented in the protected region. A resource management service may also, if given permission, enable low-side users to repair any detected missing metrics and/or alarms.

Previously, the operational health of services implemented in protected regions could only be monitored by certain administrators, engineers, or other employees of the provider network who had sufficient clearance levels to access the protected regions. As a result, missing metrics and/or alarms previously went undetected for long periods of time and the operational health of such services suffered. Such administrators, engineers, or other employees of the provider network who have sufficient clearance levels to access the protected regions are herein referred to as "high-end users." By enabling low-side users to monitor the operational health of services implemented in protected regions, the resource management service ensures better operational health of services implemented in protected regions.

Figure 3:
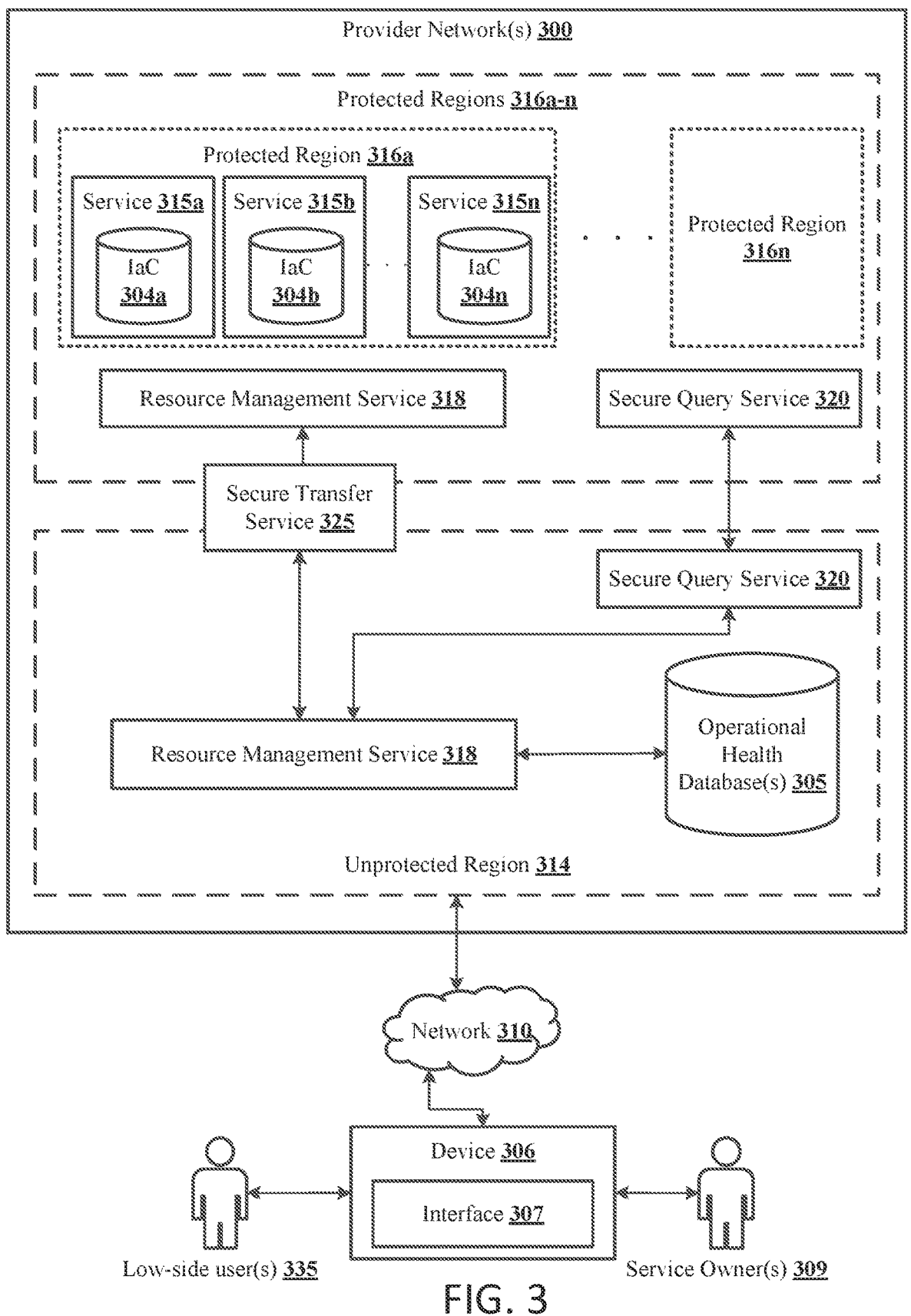
FIG. 3 is a diagram illustrating an example framework for managing resources of services implemented in a protected region of a provider network.

FIG. 3 is a diagram illustrating a framework for resource management of services implemented in a protected region of a provider network, according to some embodiments. The provider network can be subdivided into different regions. For example, as illustrated in FIG. 3, the provider network 300 may be subdivided into an unprotected region 314 and one or more protected regions 316a-n. Each region may be logically isolated from the other (and from any other regions not shown within provider network 300). For example, each region may be a distinct logical data center, supported by one or more physical data centers, and each region may have its own power supply and networking infrastructure to limit the likelihood of a failure in one region from affecting another region.

In various embodiments provider network 300 may include a plurality of areas, each having its own plurality of regions. Each area of provider network 300 may include resources located in the same geographic area (e.g., state, country, etc.). By dividing provider network 300 into various areas and regions, the data and customer instances stored therein can be protected against failure events and access to different regions and/or areas may be separately controlled.

In some embodiments, the unprotected region 314 may be a region within the provider network 300 that provides open access to, and interconnectivity among, a plurality of entities (users) of the provider network 300, including low-side users 335. The protected regions 316a-n may be regions within a private region of the provider network 300 and may be air-gapped from other regions of the provider network 300. Access to protected regions 316a-n of the provider network 300, and interconnectivity between a protected region 316a-n and other regions of the provider network 300 (e.g., ability to receive data into and send data from the protected area) may be restricted to certain users of the provider network 300.

In some embodiments, the protected regions 316a-n may comprise one or more resources. The resources may comprise compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources. These and other computing resources may be provided as internal services, such as a hardware virtualization service that can execute compute instances, a storage service that can store data objects, and/or a serverless execution service that can execute code (e.g., a program) on behalf of the customers.

To provide these and other resources, provider network 300 may rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, user of the provider network 300, such as low-side and/or high-side users, may directly utilize a compute instance hosted by the provider network 300 to perform a variety of computing tasks or may indirectly utilize a compute instance by submitting code to be executed by the provider network 300, which in turn utilizes a compute instance to execute the code (typically without the user having any control of or knowledge of the underlying compute instance(s) involved).

The resources may comprise, for instance, computation and storage resources utilized by services 315a-n implemented on various devices/hosts in the protected areas 316a-n. Because the protected regions of the provider network 300 may include sensitive or otherwise protected information (e.g., information designated by a governmental or non-governmental entity as classified data or classified metadata), access to the protected areas 316a-n may be restricted to users who have been cleared to view such protected information. Deployment, maintenance, and use of these resources may be associated with different cleared users and uncleared users, which may include internal users (e.g., users of the provider network that develop applications or services that the provider network 300 offers to external users) and external users (e.g., customers of the provider network that host their own solutions within the provider network 300). The resources may be associated with a particular user or account or may be generally accessible to multiple users and/or multiple accounts.

The services 315a-n may be any type of service. For example, the service 315a may be a payment service. In certain embodiments, each of the services 315a-n is associated with an infrastructure as code (IaC) database 304a-n. Each IaC database 304a-n can store "code" (i.e., machine-readable instructions) associated with the corresponding service 315a-n. The code may be organized as discrete definitions for each infrastructure component. The provider network 300 can execute the instructions to rapidly provision, configure, and deploy instances of a virtual computing resource.

As described above, to ensure the operational health of services, service owners 109 can set up metrics that track or monitor data related to operational health issues. For example, service owners can set up metrics that track or monitor their service's connectivity, front-end load balancers, data sources, latency, etc. over time. Additionally, to ensure that operational health issues are brought to their attention, the service owners can set up alarms that may be used to provide notification when one or more specified criteria or conditions associated with the tracked/monitored data are satisfied or are not satisfied. For example, the service owner(s) 309 can set up alarms to provide notification when one or more specified criteria associated with the data being tracked or monitored by the metrics are satisfied or are not satisfied. For example, the alarms may indicate issues with services 315a-n's connectivity, front-end load balancers, data sources, latency, etc. Such metrics and/or alarms may be indicated in or defined in the code stored in the IaC databases 304a-n. For example, the metrics and/or alarms associated with the service 315a may be stored in or defined in the IaC database 304a, the metrics and/or alarms associated with the service 315b may be stored in or defined in the IaC database 304b, etc.

The service owner 309 associated with a particular service 315a-n may be an individual or a team of individuals associated with a particular service account 315a-n in the provider network 300. The services 315a-n may be deployed in such service accounts. The service owners 309 can utilize such service accounts to interact with the provider network 300 across one or more intermediate networks 310 (e.g., the internet).

In certain embodiments, a resource management service 318 provides a framework for detecting and/or repairing missing metrics and/or alarms associated with services 315a-n implemented on various devices/hosts in the protected regions 316a-n provider network 300. For example, the resource management service 318 may enable a low-side user 335, who otherwise does not have clearance to access resources in the protected regions 316a-n, to determine if there are missing metrics and/or alarms associated with services implemented in the protected region.

In certain embodiments, the resource management service 318 enables low-side users to track parity differences in metrics and/or alarms between different regions. For example, the resource management service 318 enables low-side users to check whether one or more metrics and/or alarms that exist in a commercial region of the provider network also exist in one or more protected regions of the provider network. Without the resource management service 318, keeping metrics and/or alarms in parity in protected regions 316a-n with unprotected region 314 may require a service team to provide, to a high-side engineer, an updated IaC each time a new metric and/alarm is created in unprotected region 314. Due to the nature of such a manual process, there is a huge potential for a service team to forget to add the new metric and/or alarm to their protected regions 316a-n. The resource management service 318 mitigates this risk by enabling a low-side user 335, who otherwise does not have clearance to access resources in the protected regions 316a-n, to determine whether or not a new metric and/or alarm that was created in the unprotected region 314 also exists in the protected region 316a-n.

In certain embodiments, the resource management service 318 may also, if given permission from the service owner(s) 309, enable low-side users 335 to repair any detected missing metrics and/or alarms on the high-side. In FIG. 3, the resource management service 318 is shown as part of a provider network 300, though in other embodiments the resource management service 318 may be implemented outside of the provider network 300, such as within a private or "on premise" network environment of an organization.

In certain embodiments, the resource management service 318 comprises one or more components that may be implemented as software, hardware, or a combination of both using one or more multiple computing devices located at one or more multiple locations in the provider network 300. In some embodiments, the resource management service 318 and its components may be distributed across different regions (e.g., the unprotected region 314 and the protected region(s) 316a-n) in the provider network 300. For example, the resource management service 318 may comprise one or more components in the unprotected region 314 (i.e., "low-side stack"), and one or more components in the protected regions 316a-n (i.e., "high-side stack.") In other embodiments, the resource management service 318 and its components may be located in one region (e.g., the unprotected region 314 or the protected region(s) 316a-n) in the provider network 300.

In certain embodiments, the resource management service 318 enables low-side users 335 to detect missing metrics and/or alarms for the services 315a-n in the protected region(s) 316a-n. To do so, the resource management service 318 may utilize a secure query service 320. The secure query service 320 can enable the low-side users, who do not have clearance to access resources in the protected regions 316a-n, to nevertheless obtain information about those resources. In some embodiments, the secure query service 320 and its components may be distributed across different regions (e.g., the unprotected region 314 and the protected region(s) 316a-n) in the provider network 300. In other embodiments, the secure query service 320 and its components may be located in one region (e.g., the unprotected region 314 or the protected region(s) 316*a-n*) in the provider network 300.

In certain embodiments, metric and/or alarm patterns are stored in one or more operational health databases 305. The metric and/or alarm patterns may indicate a predefined list of metrics and/or alarms that a particular type or category of service should have in order to maintain operational health. For example, the resource management service 318 may determine the metric and/or alarm patterns for various types or categories of services based on parameters associated with certain types of accounts.

In certain embodiments, a low-side user 335 may utilize a user interface (UI) 307 of an electronic device 306 to submit a search query request. The search query request may specify a request for information regarding whether a particular metric and/or alarm exists in a protected region (e.g., 316*a*, etc.) of the provider network 300 for which the user is responsible for maintaining, troubleshooting, deploying, etc. For example, the search query request may specify a request for information regarding whether a metric and/or alarm indicated by the alarm patterns exists in a protected region (e.g., 316*a*, etc.). As another example, the search query request may specify a request for information regarding whether one or more metrics and/or alarms that exist on the low-side also exists on the high-side. The electronic device 306 can be, for example, a laptop, although the electronic device 306 can be any type of device, such as a desktop computer, a portable computing device, a smart phone, a tablet, etc.

In certain embodiments, the search query request may be received via one or more interface(s) 314, such as through use of application programming interface (API) calls, via a console implemented as a website or application, etc. The interface(s) 314 may be part of, or serve as a front-end to, a control plane 312 of the provider network 300 that includes "backend" services supporting and enabling the services that may be more directly offered to customers. The control plane 312 may handle many of the tasks involved in accepting and processing requests from users, including traffic management, authorization and access control, monitoring, and API management. For example, in some embodiments the control plane 312 creates, publishes, maintains, and monitors various APIs for users to access and interact with services of the provider network 300.

In certain embodiments, the interface(s) 314 may then transmit the search query request to the resource management service 318. For example, the interface(s) 314 may transmit the search query request to the low-side stack of the resource management service 318. In response, the resource management service 318 may transmit the search query request to the secure query service 320. The secure query service 320 may parse the resources in the corresponding IaC database 304*a-n* to identify all resources related to the queried service 315*a-n*. The secure query service 320 may then identify if the service 315*a-n* have the particular metric and/or alarm associated with any of the identified resources. The secure query service 320 may return an answer to the search query request in the unprotected region 314. The answer may indicate whether the particular metric and/or alarm exists in the protected region(s) 316*a-n* or not. The answer may be viewable by the low-side user 335 that submitted the request. For example, the low-side user may utilize the UI 307 to view the answer.

The answer that is transmitted to or viewable by the low-side user does not reveal sensitive information or actual data associated with the queried metric or alarm. Rather, the answer may simply indicate whether a label associated with that metric or alarm exists on the high-side or not. For example, if the request specifies a request for information regarding whether an availability metric exists in a protected region (e.g., 316*a*, etc.), the answer to the request may indicate that the label associated with an availability metric does or does not exist on the high-side—not that there is, for example, 98% availability. In other words, the secure query service 320 does not pass the actual value of the data being tracked or monitored by the metric, such as the actual value of utilization or CPU. For alarms, the answer may indicate that an alarm is triggered, but still will not include actual data associated with that alarm. The secure query service 320 does not pass confidential or sensitive information such as account numbers or account revenue details to the low side. Rather, the secure query service 320 can pass automized aggregate metrics to the low side.

In certain embodiments, if the particular metric and/or alarm does not exist in the protected region(s) 316*a-n*, the resource management service 318 may facilitate the creation of the alarm. For example, with the appropriate permission given from the service owner 309, the high-side stack of the resource management service 318 may create the metric and/or alarm in the protected region(s) 316*a-n*. To create the metric and/or alarm in the protected region(s) 316*a-n*, the resource management service 318 may utilize a secure transfer service 325. The secure transfer service 325 may send the IaC to create the metrics and/or alarms to the protected region(s) 316*a-n*.

In certain embodiments, the secure transfer service 325 may allow resources and metrics and/or alarms may be developed in an unprotected region 314 and transferred to a protected region(s) 316*a-n* using a computing framework. The resources may include, for example, computing infrastructure, application code, build artifacts, and/or one or more computing objects. The term computing infrastructure, as used herein, refers to resources that support execution of an application or other resources. The term build artifact, as used herein, refers to files or other resources produced by a build.

In certain embodiments, the computing framework utilized by the secure transfer service 325 may include development modules and a transfer module. The development modules include an infrastructure development module and an application development module. For a given invocation of the computing framework, a user (e.g., customer) may select to use either the infrastructure development module or the application development module, for example based on the types of resources that are being developed and transferred to the protected region(s) 316*a-n*. The development modules may allow development of metrics and/or alarms in the unprotected region 314, such as for eventual deployment of the resources in the protected region(s) 316*a-n*. The transfer module may manage transfer (and associated operations) of the metrics and/or alarms from the unprotected region 314 to the protected region(s) 316*a-n*.

In certain embodiments, the IaC for the new metrics and/or alarms may need to be reviewed and approved before the new metric and/or alarm is created. For example, if the resource management service 318 wants to create a metric and/or alarm in a protected region(s) 316*a-n*, it may create the code to create the metric or alarm and flag it for approval, such as by the service owner 309. The service owner 309 may need to give the resource management service 318 permission to create the metric or alarm in the protected region(s) 316*a-n*.

Figure 4:
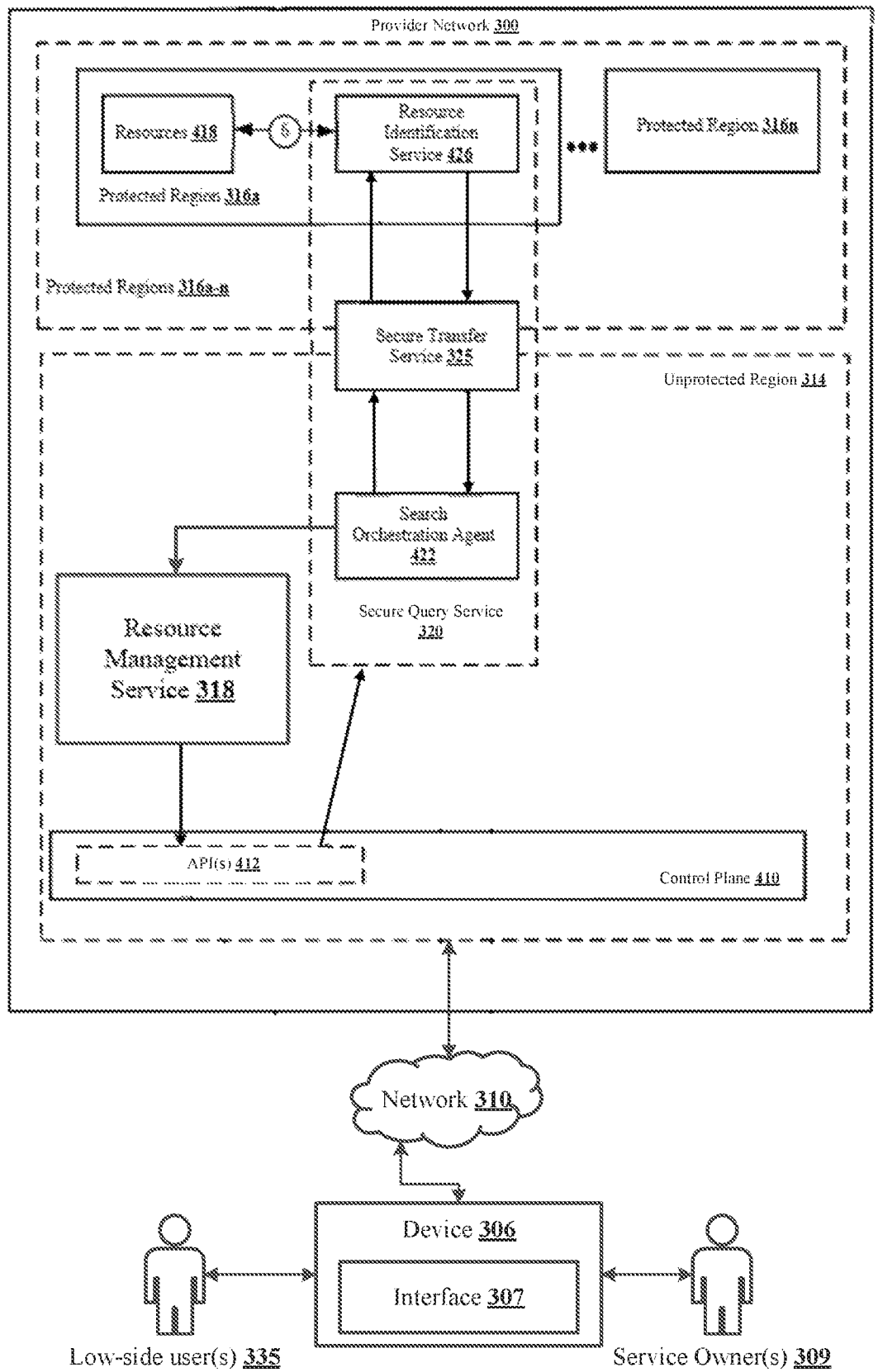
FIG. 4 is a diagram illustrating a framework for querying resources in a protected region of the provider network.

FIG. 4 is a diagram illustrating a framework for querying resources in a protected region of the provider network 300, according to some embodiments. The framework includes the secure query service 320. As described above, the secure query service 320 provides uncleared users of the provider network 300 who do not have access to the one or more of the protected regions 316A-316N with the ability to request and/or query for information about the resources 418. As discussed, previously such uncleared users would have to request such information from cleared users. Because there are typically many fewer cleared users than uncleared users, this can be a time-consuming process for the cleared users to respond to such requests. Additionally, it introduces the possibility of human error leading to incorrect or inaccurate information about the resources being relayed to the uncleared users, leading to further delays in deploying infrastructure, troubleshooting, or otherwise maintaining the protected regions of the provider network.

The secure query service 320 may include various components, modules, or functionalities such as a search orchestration agent 422, the secure transfer service 325, and a resource identification service 426. The components may be implemented in hardware, software, or a combination of both and collectively used by the secure query service 320 for executing search queries against resources hosted in one or more protected regions 316A-316N of the provider network.

In some embodiments, the secure query service 320 and its components may be distributed across different regions (e.g., the public region 314 and the protected region(s) 316A-316N) in the provider network. For instance, as shown in FIG. 4, the search orchestration agent 422 may be implemented in the public region 314 and used by the secure query service 320 to obtain search requests (from users) for resources residing in the protected regions 316A-316N of the provider network. The resource identification service 426 may be implemented in the protected regions 316A-316N and used by the secure query service 320 to execute the search requests and provide search responses to the users. The secure transfer service 325 may include one or more components, modules, or functionalities that may be implemented in both the public region 314 and protected regions 316A-316N. In some embodiments, the secure query service 320 may utilize the secure transfer service 325 to process search requests for metrics and/or alarms residing in the protected regions 316A-316N, cause the execution of the search requests against the metrics and/or alarms and send search responses to the users.

In some embodiments, a search query request may be submitted to the secure query service 320 via the resource management service 318. For example, a user may interact with a user interface (UI) 307 to submit the search query request to the resource management service 318. The resource management service 318 may forward the search query request to the secure query service 320. In some embodiments, the user may first be authenticated using an authentication service in the provider network which authenticates the user making the search request prior to submitting the search request to the secure query service 320. For instance, the authentication service 328 may authenticate the user based on data provided by the user (e.g., credentials, encrypted material, etc.).

In some embodiments, the search query request may specify a request for information about one or more metrics and/or alarms in a protected region (e.g., 316A) of the provider network for which the user is responsible for maintaining, troubleshooting, deploying, etc. (e.g., the user has an account associated with the resource). In some embodiments, the search query request may specify one or more search parameters. For instance, the search parameters may include an identifier (e.g., name) of the metric and/or alarm and an identifier of a protected region (e.g., 316A) where the metric or alarm is located. For example, a search query request for information about a metric or alarm in a protected region 316A may specify an identifier or label associated with the metric or alarm and an identifier of the protected region 316A where alarm may be located.

The search query request may be received via one or more APIs 412 in the control plane 410 which may then transmit the search query request to the secure query service 320. The control plane 410 may handle many of the tasks involved in accepting and processing requests from users, including traffic management, authorization and access control, monitoring, and API management. For example, in some embodiments the control plane 410 creates, publishes, maintains, and monitors various APIs for users to access and interact with services of the provider network 300.

Secure query service 320 can receive the search query request (e.g., directly via the resource management service 318, or via API 412). The search query request may be received by the search orchestration agent 422 in the secure query service 320. As discussed further below, the search orchestration agent 422 can store a record of the search and pass the search to secure transfer service 325.

As shown in FIG. 4, secure transfer service 325 may be implemented across the public region and the protected region of the provider network. For example, the secure transfer service 325 may include a first storage location hosted in the public region in which the search query request may be stored. The secure transfer service 325 can verify the search query request (e.g., apply a first schema provided by the protected region to the search query request) before passing the search query request to a second storage location hosted in the destination protected region 316A. The first schema may validate one or more attributes of the search request.

Once the search query request has been added to the second storage location an event can be generated and sent to resource identification service 426. Resource identification service 426 may then perform the query on resources or alarms 418. For example, the resource identification service 426 may execute the search request on the at least one alarm in the protected region using the name of the at least one alarm and obtain metadata associated with the at least one alarm in response to the search request. The resource identification service 426 may then generate a response based on the query results. The resource identification service 426 can add the response to the second storage location of secure transfer service 325. The response can be verified using a second schema provided by the protected region 316A to ensure the response includes only data that is allowed to be sent from the protected region to a public region. The second schema may validate one or more attributes of the search request.

Once the response is verified, it can be added to the first storage location of the secure transfer service 325. This may trigger an event to search orchestration agent 422 indicating that a response has been added to the first storage location. Search orchestration agent 422 can obtain the response from the first storage location and provide the response to the resource management service 318. The resource management service 318 may forward an indication of the response to the requesting user.

As described above, the response does not reveal sensitive information or actual data associated with the queried metric or alarm. Rather, the response may simply indicate whether a label associated with that metric or alarm exists on the high-side or not. For example, if the request specifies a request for information regarding whether an availability metric exists in a protected region (e.g., 316*a*, etc.), the response may indicate that the label associated with an availability metric does or does not exist on the high-side—not that there is, for example, 98% availability. In other words, the secure query service 320 does not pass the actual value of the data being tracked or monitored by the metric, such as the actual value of utilization or CPU. For alarms, the response may indicate that an alarm is triggered, but still will not include actual data associated with that alarm. The secure query service 320 does not pass confidential or sensitive information such as account numbers or account revenue details to the resource management service 318. Rather, the secure query service 320 can pass automized aggregate metrics to the resource management service 318.

Figure 5:
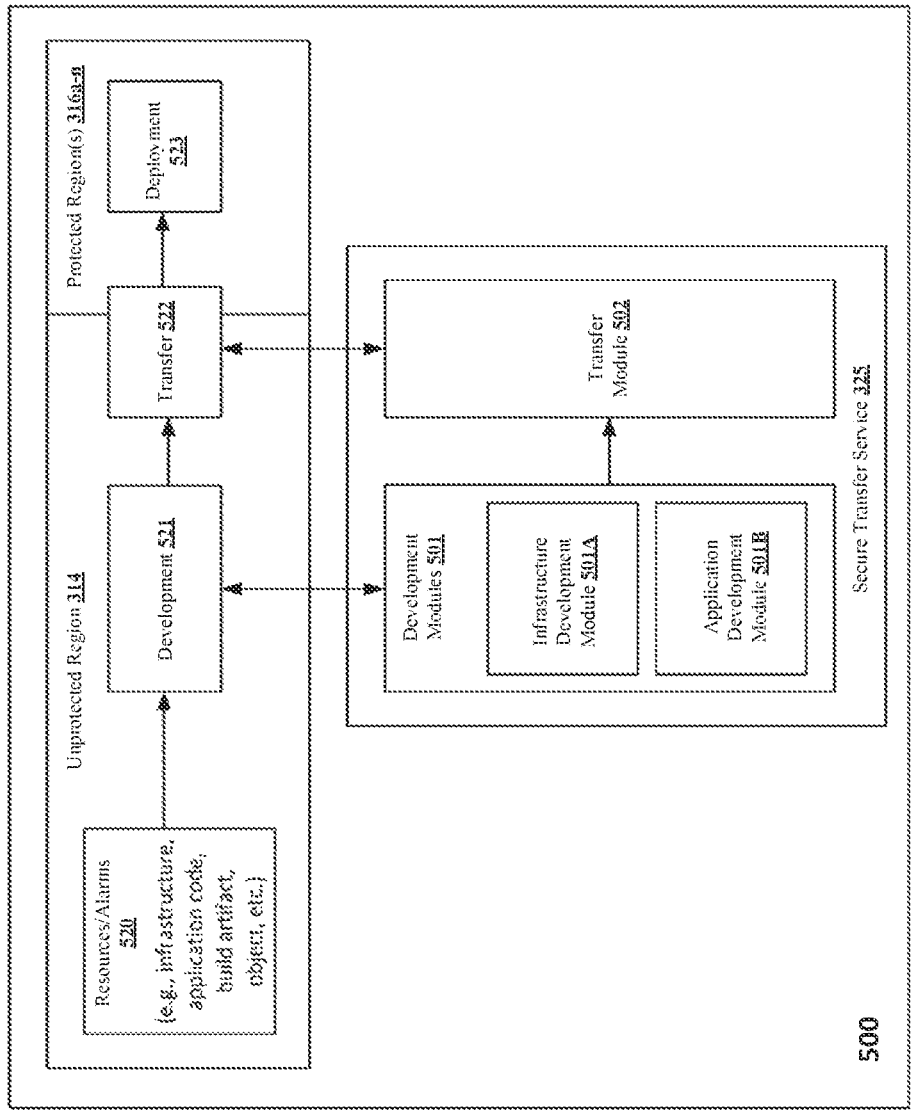
FIG. 5 is a diagram illustrating an example of an unprotected to protected computing development and transfer system.

FIG. 5 is a diagram illustrating an example of an unprotected to protected computing development and transfer system 500 that may be used in accordance with the present disclosure. As shown in FIG. 5, one or more metrics and/or alarms 520 may be developed in an unprotected region 314 and transferred to a protected region 316*a-n* using computing framework 550. The unprotected region 314 and the protected region 316*a-n* are computing regions provided by a computing services provider (e.g., a cloud and/or web services provider). In one example, the protected region 316*a-n* is a classified region, and the unprotected region 314 is an unclassified region.

The metrics and/or alarms 520 may include, for example, computing infrastructure, application code, build artifacts, and/or one or more computing objects. The term computing infrastructure, as used herein, refers to resources that support execution of an application or other resources. The term build artifact, as used herein, refers to files or other resources produced by a build. As shown, the secure transfer service 325 includes development modules 501 and transfer module 502. The development modules 501 include infrastructure development module 501A and application development module 501B. As described above, in some examples, for a given invocation of the secure transfer service 325, a user (e.g., customer) may select to use either infrastructure development module 501A or application development module 501B, for example based on the types of metrics and/or alarms 520 that are being developed and transferred to the protected region 316*a-n*. For example, a user may select to user the infrastructure development module 501A to develop IaC for an alarm.

As shown in FIG. 5, the development modules 501 may allow development 521 of metrics and/or alarms 520 in the unprotected region 314, such as for eventual deployment 523 of the resources or alarms 520 in the protected region 316*a-n*. As also shown in FIG. 5, the transfer module 502 may manage transfer 522 (and associated operations) of the metrics and/or alarms 520 from the unprotected region 314 to the protected region 316*a-n*. Some examples of stages and features of the infrastructure development module 501A and the transfer module 502 are described in detail below with reference to FIGS. 6-7.

Figure 6:
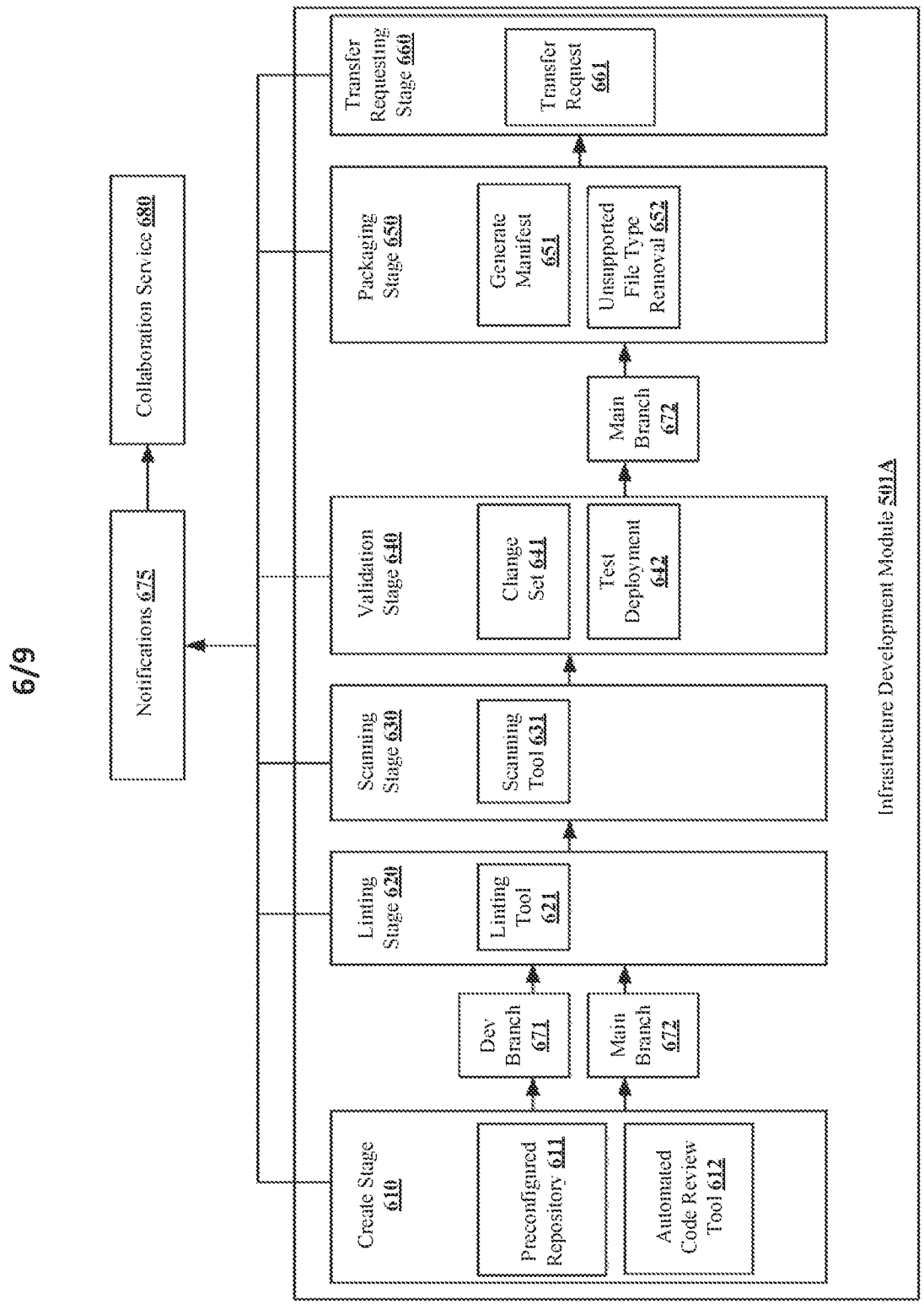
FIG. 6 is a diagram illustrating an example infrastructure development module.

Referring now to FIG. 6, some example stages and features of infrastructure development module 501A will now be described in detail. As described above, in some examples, the infrastructure development module 501A may be employed for developing computing infrastructure for deployment in protected region 316*a-n*. As shown, the infrastructure development module 501A may include a create stage 610, in which metrics and/or alarms 520 may be created in, and received from, a preconfigured repository 611 of a managed source control service. The preconfigured repository 611 may be designed to help developers continuously create code, templates, documentation, and deliverables with little friction. The preconfigured repository 611 may include easily removable examples and documentation, such as default code for executing in a customer environment and best practices associated with use of various services. In some examples, the infrastructure development module 501A may provide code review tool 612, which may be an automated (e.g., machine learning-based) tool for use in reviewing and debugging code that may be in the preconfigured repository 211.

The preconfigured repository 611 may include a development (dev) branch 671 and a main branch 672. As software is developed, not every commit is likely to be worthy of the time and effort to individually transfer to the protected region 316*a-n*. Thus, the dev branch 671 may be used to develop resources or alarms until those resources or alarms reach a desired level of maturity (e.g., pass a certain level of testing). Once changes have reached the desired level of maturity, the changes may be merged from the dev branch 671 to the main branch 672 and packaged and transferred to the protected region 316*a-n*.

The infrastructure development module 501A may also include a linting stage 620 (for both the dev branch 671 and the main branch 672), in which metrics and/or alarms 520 may be linted using linting tool 621, which may be an automated tool for resource linting. The term linting, as used herein, refers to a static code or other static analysis, such as to determine programming errors, bugs, etc. For example, the linting stage 620 may include reviewing templates and ensuring that security-related best practices are observed. The infrastructure development module 501A may also include a scanning stage 630 (for both the dev branch 671 and the main branch 672), in which metrics and/or alarms 520 may be scanned for computing viruses using scanning tool 631, which may be an automated tool for resource scanning.

The infrastructure development module 501A may also include a validation stage 640 (for both the dev branch 671 and the main branch 672), in which secure transfer service 325 may determine, for example based on templates or other information from the preconfigured repository 611, a change set 641 (or other changes) associated with the infrastructure or other metrics and/or alarms 520 being developed. The secure transfer service 325 may then attempt a test deployment 642 of the change set 641 (or other changes), for testing purposes, in the unprotected region 314. If the changes are deployed successfully in the unprotected region 314, then this may be an indication that the changes are likely to deploy successfully in protected region 316*a-n*. By contrast, if the changes are not deployed successfully in the unprotected region 314, then this may be an indication that the changes are unlikely to deploy successfully in the protected region 316*a-n*. In some examples, the test deployment 642 in the unprotected region 314 may be subject to customer-specific constraints, such as identity management permissions associated with the customer. For example, if a customer's identity management permissions require that a given role must create a key, while another role must create a database table, then these constraints may be enforced during the test deployment in the unprotected region 314. This may help the customer to determine potential permissions-related problems prior to deployment in the protected region 316a-n. In some examples, if an architecture requires virtual private clouds, then virtual private clouds that mimic the customer's environment may optionally be deployed.

The infrastructure development module 501A may also include a packaging stage 650 (for main branch 672), in which metrics and/or alarms 520 may be packaged for transfer to protected region 316a-n. For example, on successful builds of the main branch 672, one or more files of the main branch 672 (and optionally the corresponding build artifacts) may be placed in a storage location (e.g., bucket) for testing and delivery. Specifically, in some examples, a region transfer tool, which may be used to transfer resources to the protected region 316a-n, may provide two types of transfers, which are file transfers and software artifact transfers.

Additionally, in some examples, the region transfer tool may support file transfers only for certain file types. File types that are supported by the region transfer tool that is being used are referred to hereinafter as supported file types. By contrast, file types that are not supported by the region transfer tool that is being used are referred to hereinafter as unsupported file types. In some examples, the packaging stage 650 may include unsupported file type removal 651. During unsupported file type removal 651, unsupported file types may be identified and removed from the metrics and/or alarms 520 that are being transferred to the protected region 316a-n. Furthermore, in some examples, for software artifact transfers, the region transfer tool may require a manifest file to be generated for the metrics and/or alarms 520 that are being transferred to the protected region 316a-n.

In some examples, the packaging stage 650 may additionally or alternatively include manifest generation 652, in which the manifest file may be generated. In some examples, a manifest file may sometimes be generated even if not explicitly required by a region transfer tool that is being used to perform the resource transfer to the protected region 316a-n. Upon performance of unsupported file type removal 651 and/or manifest generation 652, the resulting payload may be uploaded to a data storage service. The data may be protected at rest using customer-managed keys in a key management service. It is noted that data that is in transit at one or more stages of the secure transfer service 325 may optionally be protected using secure sockets layer (SSL)/transport layer security (TLS) calls to a software development kit (SDK), such as provided by a cloud/hosting service.

As shown in FIG. 6, notifications 675 may be generated by the infrastructure development module 501A. The notifications 675 may correspond to any, or all, of create stage 610, linting stage 620, scanning stage 630, validation stage 640, packaging stage 650 and/or transfer requesting stage 660 (referred to collectively hereinafter as stages 620-660). For example, in some cases, one or more of notifications 675 may provide an indication of an initiation and/or a successful completion of any one or more of stages 620-660. Additionally, in some examples, one or more of notifications 675 may indicate a problem and/or error associated with any one or more of stages 620-660. As a specific example, in some cases, if any infected files are found during scanning stage 630, the secure transfer service 325 may abort the build process and provide an indication of the results via one or one or more of notifications 675. In some examples, the notifications 675 may be provided to one or more designated recipients. In some examples, a designated recipient may itself include a group of recipients. In one specific example, a designated recipient may be a topic of a notification service, such as may be identified using a resource or alarm name.

In some examples, developers that are working on the development 521 of metrics and/or alarms 520 may collaborate with one another using a collaboration service 680. Additionally, in some examples, the collaboration service 680 may be subscribed to receive notifications 675. This may allow the developers to be quickly and consistently informed of updates to the status of the development 521 and transfer 522 of metrics and/or alarms 520. In one specific example, a systems manager service parameter may be provided with a webhook associated with one or more features (e.g., a chat room) of the collaboration service 680, and a serverless computing function that writes to that webhook may be subscribed to a designated recipient (e.g., a topic of a notification service) of notifications 675. In some examples, an identification of the webhook may be stored in a parameter store and may be encrypted with a service-managed key.

As also shown in FIG. 6, the infrastructure development module 501A may further include a transfer requesting stage 660 (for main branch 672), in which a transfer request 661 may be sent to transfer module 502. In some examples, the transfer request 661 may be sent by a serverless computing function. In addition to, or as part of, the transfer request 661, the infrastructure development module 501A may provide related information to the transfer module 502, such as an indication of a storage location (e.g., bucket) at which the payload for transfer is stored, a payload key, a manifest key, and an indication of a designated recipient that is to receive notifications about the transfer request 661, which may be the same designated recipient (e.g., a topic of a notification service) that may receive notifications 675 from infrastructure development module 501A.

Figure 7:
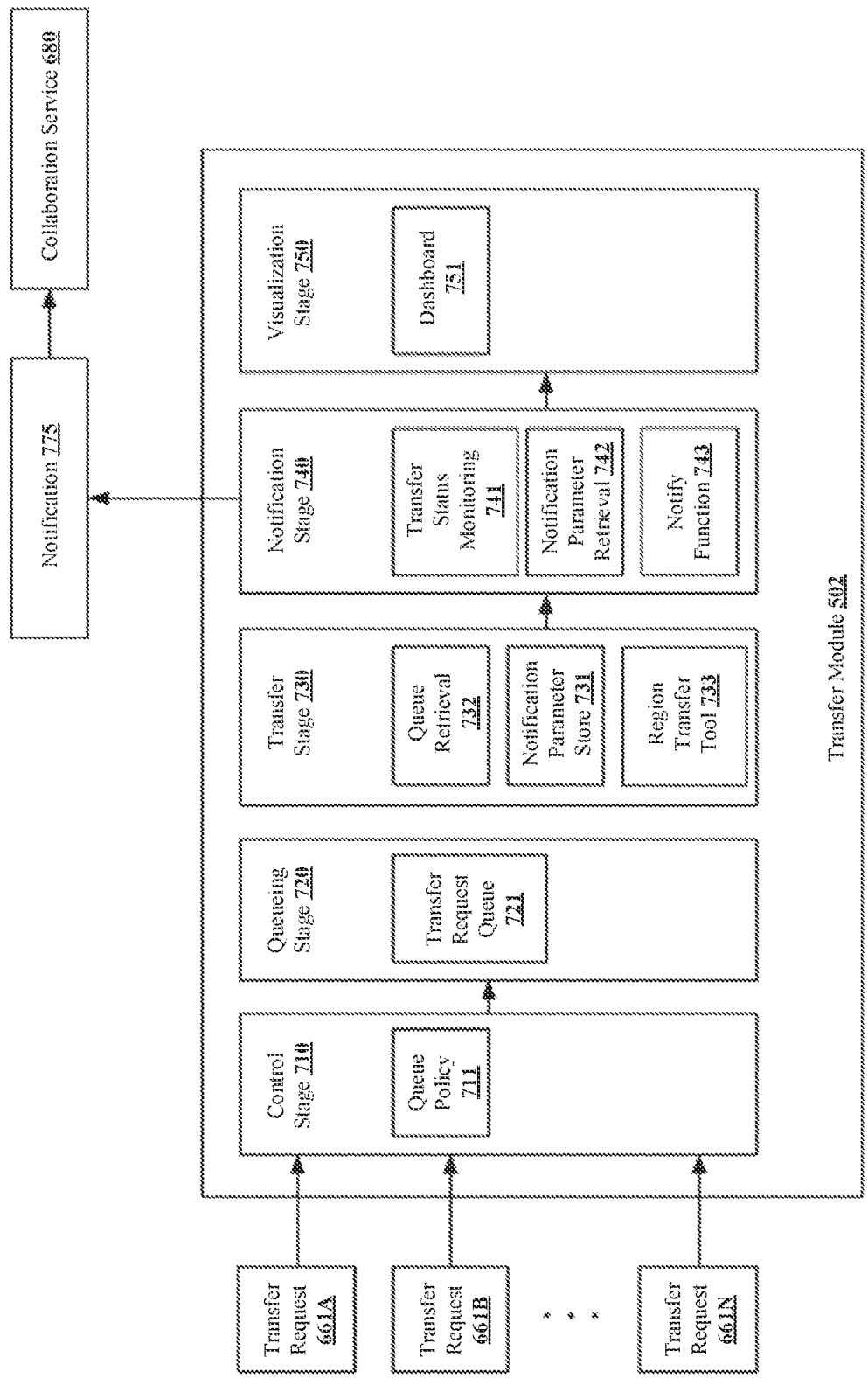
FIG. 7 is a diagram illustrating an example transfer module.

Referring now to FIG. 7, some example stages and features of transfer module 502 will now be described in detail. As shown in FIG. 7, transfer requests 661A-N may be received by transfer module 502. The transfer requests 661A-N are individual instances of transfer request 661 may be issued by infrastructure development module 501A and/or application development module 501B. The transfer requests 661A-N may be sent to a transfer request queue 721. The transfer request queue 721 may be protected by a queue policy 711, which may allow only principals from certain designated accounts to write to the transfer request queue 721. For example, a customer may identify the accounts that the customer wishes to authorize to issue transfer requests 661A-N. These identified accounts may then be listed in queue policy 711. During control stage 710, the transfer module 502 may examine incoming transfer requests 661A-N to ensure that each of the transfer requests 661A-N is issued by one of the listed authorized accounts. If a given one of the transfer requests 661A-N is issued by one of the listed authorized accounts, then it may be added to the transfer request queue 721. By contrast, if another given one of the transfer requests 661A-N is not issued by one of the listed authorized accounts, then it may be excluded from the transfer request queue 721. In some examples, a hub and spoke model may be employed in which multiple development module accounts feed (i.e., provide transfer requests 661A-N to) a single transfer module 502 (executed in a single transfer module account). In some examples, the list of authorized accounts may be stored in a parameter store and may be encrypted with a service-managed key.

At queueing stage 720, the authorized ones of transfer requests 661A-N are written to the transfer request queue 721. As described above, each of transfer requests 661A-N may include, or may be associated with, related information, such as a payload key, a manifest key, and an indication of a designated recipient that is to receive notifications. This related information may also be stored in, or referenced by, transfer request queue 721.

The transfer module 502 also includes a transfer stage 730, at which metrics and/or alarms 520 are transferred to the protected region 316a-n via a region transfer tool 733. Specifically, during queue retrieval 732 of transfer stage 730, a series of serverless computing functions may read off the transfer request queue 721. In particular, when a next one of transfer requests 661A-N is ready to be processed (e.g., when it moves to the front of the transfer request queue 721), the corresponding queue entry will be read from transfer request queue 721. This may also include reading of related information included in, or otherwise associated with, the entry, such as a payload key, a manifest key, and an indication of a designated recipient that is to receive notifications. Based on this related information, the series of serverless computing functions may copy the payload for transfer to a designated storage service location. The series of serverless computing functions may also initiate transfer of the payload via region transfer tool 733, which may then perform the transfer of the corresponding resources 520 to the protected region 316a-n. Data in the designated storage service location and the transfer request queue 721 may be protected at rest using customer-managed keys of a key management service. A manifest for the transfer may also be obtained based on information provided in the transfer request 661 and provided to the region transfer tool 733. In some examples, a key management service asymmetric key may be generated in a development module account and used to sign the manifest. The transfer module account may then be granted permissions to verify the signature with the key management service to ensure that the signature is valid. Other checks may be also performed, such as to confirm that the signature matches with the file.

Additionally, a transfer identifier (ID) for the transfer may be received from the region transfer tool 733. Furthermore, an identifier of a designated notification recipient (e.g., a resource name for a topic of the notification service) for the transfer may be determined based on information provided by the development module 501 in combination with the transfer request 661. The series of serverless computing functions may then store an association between the transfer ID and the designated notification recipient in a notification parameter store 731, such as may be provided by a database service. The data in the notification parameter store 731 may be protected using service-managed keys of a key management service.

The transfer module 502 also includes a notification stage 740. The notification stage 740 includes status monitoring 741, at which the region transfer tool 733 may be monitored to listen for a report of the status (e.g., success, failure or rejection) of the transfer operation. In some examples, the status monitoring 741 may be performed via an event of a monitoring service. This event may then trigger a serverless computing function with the status of the transfer operation. The report of the status may include the transfer ID for the transfer. During notification parameter retrieval 742, the transfer ID received with the status may be used to look up, in the notification parameter store 731, the corresponding designated notification recipient (e.g., a resource name for a topic of the notification service) for the transfer. A notify function 743, such as a serverless computing function, may then send a notification 775 with the transfer ID and transfer status (e.g., success, failure or rejection) to the corresponding designated notification recipient. This may optionally cause the notification 775 to be received in a collaboration service 680, which, as described above, may be subscribed, such as via a webhook, to the designated notification recipient. This may allow developers that are working on the resources 520 to be notified of the statuses of transfer of the metrics and/or alarms 520 even when the account that issues a transfer request 661 (e.g., the development module account) is different from the account that executes the transfer module 502 (e.g., the transfer module account). The corresponding record (i.e., the association between the transfer ID and the designated notification recipient) may then be deleted from the notification parameter store 731.

The transfer module 502 also includes a visualization stage 750. As part of the visualization stage 750, statuses of transfer requests 661A-N may be displayed to users via a dashboard 751, such as may be provided by a monitoring service. In some examples, the dashboard 751 may display indications of transfers of transfer module 502 categorized into different status categories (e.g., success, failure or rejection), for example based on parameters such as count and size.

Figure 8:
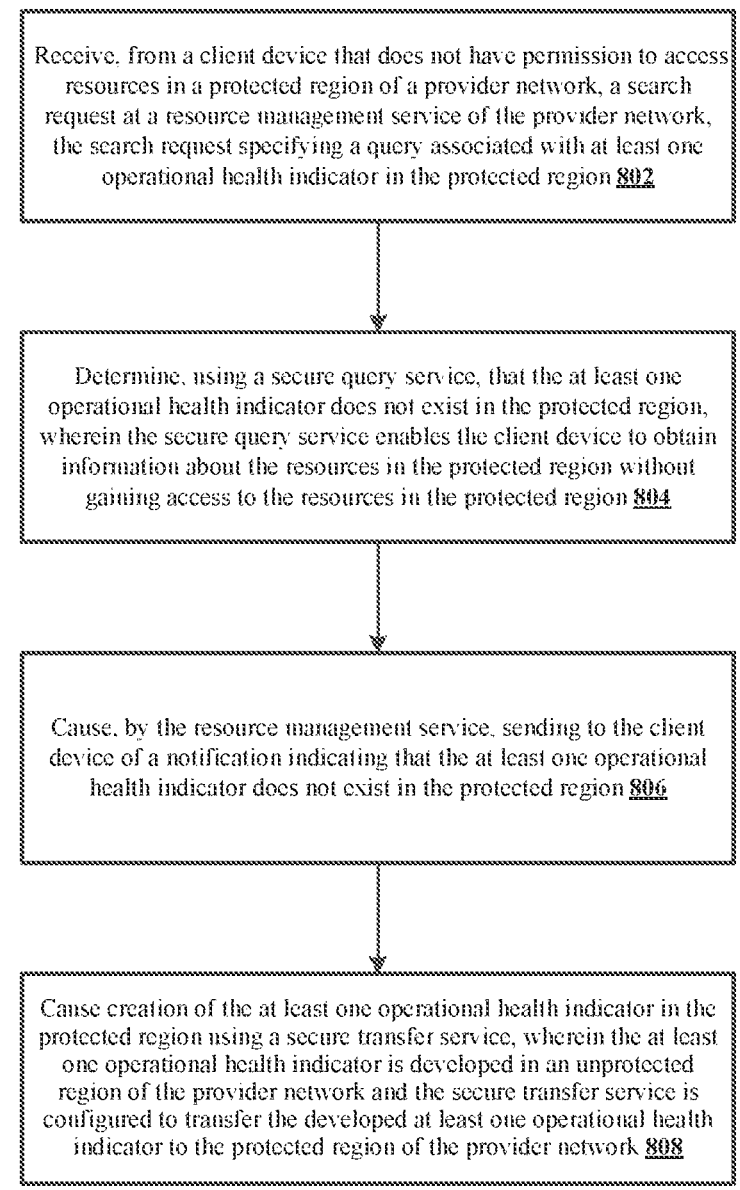
FIG. 8 is a flowchart showing an example process for resource management.

FIG. 8 illustrates a flow diagram 800 showing an illustrative routine for managing resources in protected region(s) of a provider network. At 802, a search request may be received, from a client device that does not have permission to access to resources in a protected region (i.e., protected region(s) 316a-n) of a provider network. The search request may be received, for example, at a resource management service (i.e., resource management service 318) of the provider network. The search request specifying a query associated with at least one operational health indicator in the protected region. For example, a low-side user may want to determine if the at least one operational health indicator exists in the protected region. The search request may specify a query as to whether or not the at least one operational health indicator exists in the protected region. The at least one operational health indicator may include one or more alarms and/or one or more metrics.

In certain embodiments, a low-end user may want to track parity differences in operational health indicators between different regions. For example, the at least one operational health indicator may include an operational health indicator that was created in an unprotected region (i.e., unprotected region 314). The low-end user may want to determine whether the operational health indicator that was created in an unprotected region also exists in the protected region.

At 804, it may be determined, using a secure query service (i.e., secure query service 320), that the at least one operational health indicator does not exist in the protected region. The secure query service enables the client device to obtain information about the resources in the protected region without gaining access to the resources in the protected region.

In certain embodiments, the secure query service may be configured to add the search request to a first storage location in an unprotected region of the provider network. The secure query service may then apply a first schema to the search request to produce a filtered search request. The first schema may validate one or more attributes of the search request. The secure query service may then send the filtered search request to a second storage location in the protected region and execute the search request on the at least one operational health indicator in the protected region using the name of the at least one alarm. The secure query service may obtain metadata associated with the at least one operational health indicator in response to the search request and generate a search result including the metadata associated with the at least one operational health indicator. The search result may indicate whether or not the at least one operational health indicator exists in the protected region. The secure query service may apply a second schema to the search result to produce a filtered search result. The second schema may validate one or more attributes of the search result. The secure query service may generate a search response based on the filtered search result and return the search response to the resource management service.

At 806, sending of a notification to the client device indicating that the at least one operational health indicator does not exist in the protected region may be caused. For example, sending of a notification may be caused by the resource management service. The notification may be sent in response to receiving the search response from the secure query service. For example, if the search response from the secure query service indicates that the at least one operational health indicator does not exist in the protected region, the notification indicating that the at least one operational health indicator does not exist in the protected region may be sent (such as via a UI associated with the resource management service, email, text, phone call, or any other form of communication).

In certain embodiments, the resource management service may facilitate the creation of the at least one missing operational health indicator. For example, with the appropriate permission given from the service owner, the high-side stack of the resource management service may create the operational health indicator in the protected region. To create the operational health indicator in the protected region, the resource management service may utilize a secure transfer service (i.e., secure transfer service 325). The secure transfer service may allow operational health indicators to be developed in an unprotected region and transferred to a protected region(s) using a computing framework. At 808, creation of the at least one operational health indicator in the protected region may be caused using a secure transfer service. The at least one operational health indicator may be developed in an unprotected region of the provider network and the secure transfer service may be configured to transfer the developed at least one operational health indicator to the protected region of the provider network.

In certain embodiments, secure transfer service may be configured to receive, in the unprotected region, the developed at least one operational health indicator. The secure transfer service may scan, in the unprotected region, the developed at least one operational health indicator for computing viruses and perform, in the unprotected region, a test deployment of the developed at least one operational health indicator. The secure transfer service may package, in the unprotected region, the developed at least one operational health indicator for transfer to the protected region. The packaging comprises at least one of generating a manifest file for the developed at least one operational health indicator or removing file types of the developed at least one operational health indicator that are unsupported by a region transfer tool of the secure transfer service. The secure transfer service may transfer, via the region transfer tool, the packaged, developed at least one operational health indicator from the unprotected region to the protected region.

Figure 9:
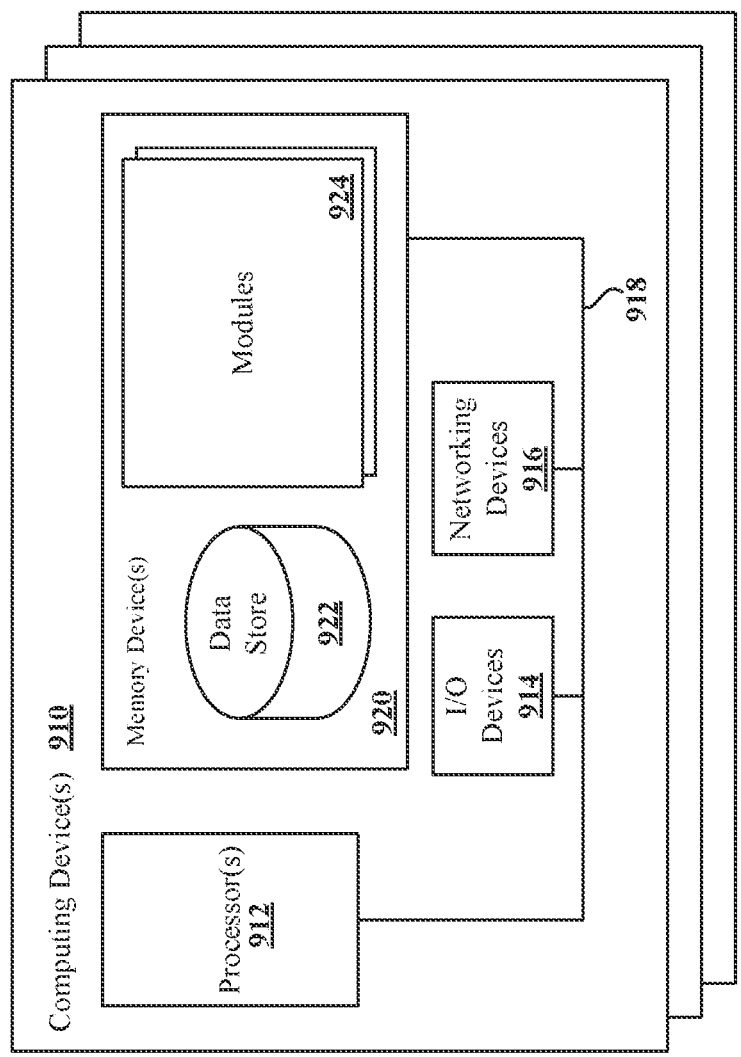
FIG. 9 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 9 depicts a general-purpose computer system that includes or is configured to access one or more computer-accessible media. The example computer system of FIG. 9 may be configured to implement provider network 100 of FIG. 1, provider network 300, and/or any component of the provider network 100 or 300, the network 110, the network 310, the user device 106, or the user device 306. The example computer system of FIG. 9 may be configured to implement any of the methods described herein, such as any methods (e.g., or any operations) associated with FIG. 8.

In the illustrated embodiment, computing system 900 includes one or more processors 910a, 910b and/or 910n (which may be referred herein singularly as "a processor 910" or in the plural as "the processors 910") coupled to a system memory 920 via an input/output (I/O) interface 930. Computing system 900 further includes a network interface 940 coupled to I/O interface 930.

In various embodiments, the computing system 900 may be a uniprocessor system including one processor 910 or a multiprocessor system including several processors 910 (e.g., two, four, eight or another suitable number). Processors 910 may be any suitable processors capable of executing instructions. For example, in various embodiments, processors 910 may be general-purpose or embedded processors implementing any of a variety of instruction set architectures (ISAs), such as the x96, PowerPC, SPARC or MIPS ISAs or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random-access memory (SRAM), synchronous dynamic RAM (SDRAM), nonvolatile/Flash©-type memory or any other type of memory. In the illustrated embodiment, program instructions and data implementing one or more desired functions, such as those methods, techniques and data described above, are shown stored within system memory 920 as code 925 and data 926.

In an embodiment, I/O interface 930 may be configured to coordinate I/O traffic between processor 910, system memory 920 and any peripherals in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computing system 900 and other device or devices 960 attached to a network or networks 950, such as other computer systems or devices, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fiber Channel SANs (storage area networks) or via any other suitable type of network and/or protocol.

In some embodiments, system memory 920 may be a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing system 900 via I/O interface 930. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing system 900 as system memory 920 or another type of memory. Further, a computer-accessible medium may include transmission media or signals such as electrical, electromagnetic or digital signals conveyed via a communication medium such as a network and/or a wireless link, such as those that may be implemented via network interface 940. Portions or all of multiple computing devices such as those illustrated in FIG. 9 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing system," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As an example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for resource management, the method comprising:
    receiving, from a client device that does not have permission to access resources in a protected region of a provider network, a search request at a resource management service of the provider network, the search request specifying a query associated with at least one operational health indicator in the protected region, wherein the protected region has restricted connectivity with at least one other region in the provider network;
    determining, using a secure query service, that the at least one operational health indicator does not exist in the protected region, wherein the secure query service enables the client device to obtain information about the resources in the protected region without gaining access to the resources in the protected region by sending the query regarding the status of the operational health indicator and receiving filtered results without receiving information retrieved by the query; and causing, by the resource management service, sending to the client device of a notification indicating that the at least one operational health indicator does not exist in the protected region.

2. The method of claim 1, wherein determining, using the secure query service, that the at least one operational health indicator does not exist in the protected region by sending the query regarding the status of the operational health indicator and filtering the results comprises forwarding the search request to the secure query service, wherein the secure query service:

sends a filtered search request validated by one or more attributes of a first schema to a storage location in the protected region;

executes the search request on the at least one operational health indicator in the protected region using the name of the at least one operational health indicator;

generates a search result including metadata associated with the at least one operational health indicator; and returns a search response based on filtering the search result by validating one or more attributes with a second schema.

3. The method of claim 1, further comprising:

causing creation of the at least one operational health indicator in the protected region using a secure transfer service, wherein the at least one operational health indicator is developed in an unprotected region of the provider network and the secure transfer service is configured to transfer the developed at least one operational health indicator to the protected region of the provider network.

4. The method of claim 3, wherein the secure transfer service is configured to:

determine, in the unprotected region, whether the developed at least one operational health indicator is free of malicious components;

package, in the unprotected region, the developed at least one operational health indicator for transfer to the protected region by generating a manifest file for the developed at least one operational health indicator; and transfer, via the secure transfer service, the packaged, developed at least one operational health indicator from the unprotected region to the protected region.

5. The method of claim 3, wherein the developed at least one operational health indicator comprises an infrastructure as code (IaC) to create the at least one operational health indicator in the protected region.

6. A system for resource management, the system comprising:

at least one processor in communication with at least one memory, the at least one processor configured at least to:

receive in a first region of a provider network a request from a client, the request indicative of performing a query associated with at least one operational health indicator in a protected region of the provider network, wherein the protected region has restricted access and restricted connectivity with the first region in the provider network;

determine, by a query service with access to the protected region, that the at least one operational health indicator does not exist in the protected region, wherein the query service performs the query on the at least one operational health indicator in the protected region and returns filtered information indicative of the presence without sending the information retrieved from the at least one operational health indicator; and sending to the client device of a notification indicating that the at least one operational health indicator does not exist in the protected region.

7. The system of claim 6, wherein determining, by the query service, that the at least one operational health indicator does not exist in the protected region comprises executing the query on the at least one operational health indicator in the protected region.

8. The system of claim 7, wherein the at least one processor is further configured to:

cause creation of the at least one operational health indicator in the protected region using a secure transfer service, wherein the at least one operational health indicator is developed in an unprotected region of the provider network and the secure transfer service is configured to transfer the developed at least one operational health indicator to the protected region of the provider network.

9. The system of claim 8, wherein the secure transfer service is configured to:

determine, in the unprotected region, whether the developed at least one operational health indicator is free of malicious components;

package, in the unprotected region, the developed at least one operational health indicator for transfer to the protected region by generating a manifest file for the developed at least one operational health indicator; and transfer, via the secure transfer service, the packaged, developed at least one operational health indicator from the unprotected region to the protected region.

10. The system of claim 9, wherein the developed at least one operational health indicator comprises an infrastructure as code (IaC) to create the at least one operational health indicator in the protected region.

11. The system of claim 7, wherein the at least one operational health indicator exists in at least one different region of the provider network.

12. The system of claim 7, wherein the at least one operational health indicator comprises an alarm.

13. The system of claim 7, wherein the at least one operational health indicator comprises a metric.

14. A non-transitory computer-readable medium storing instructions that, when executed, causes at least one computing node to perform the operations comprising:

receiving in a first region of a provider network a request from a client, the request indicative of performing a query associated with at least one operational health indicator in a protected region of the provider network, wherein the protected region has restricted access and restricted connectivity with the first region in the provider network;

determining, by a query service with access to the protected region, that the at least one operational health indicator does not exist in the protected region, wherein the query service performs the query on the at least one operational health indicator in the protected region and returns filtered information indicative of the presence of the at least one operational health indicator without sending the information retrieved from the at least one operational health indicator; and causing sending information to the client indicating that the at least one operational health indicator does not exist in the protected region.

15. The non-transitory computer-readable medium of claim 14, wherein determining, by the query service, that the at least one operational health indicator does not exist in the protected region further causes the at least one computing node to perform the operation comprising executing the query on the at least one operational health indicator in the protected region.

16. The non-transitory computer-readable medium of claim 14, wherein the instructions, when executed, further causes the at least one computing node to perform the operations comprising:
   causing creation of the at least one operational health indicator in the protected region, wherein the at least one operational health indicator is developed in an unprotected region of the provider network; and
   transferring, by a secure transfer service, the developed at least one operational health indicator to the protected region of the provider network.

17. The non-transitory computer-readable medium of claim 16, wherein transferring, by the secure transfer service, the developed at least one operational health indicator to the protected region of the provider network further causes the at least one computing node to perform the operations comprising:
   determining, in the unprotected region, whether the developed at least one operational health indicator is free of malicious components;
   packaging, in the unprotected region, the developed at least one operational health indicator for transfer to the protected region by generating a manifest file for the developed at least one operational health indicator; and
   transferring, via the secure transfer service, the packaged, developed at least one operational health indicator from the unprotected region to the protected region.

18. The non-transitory computer-readable medium of claim 16, wherein the developed at least one operational health indicator comprises an infrastructure as code (IaC) to create the at least one operational health indicator in the protected region.

19. The non-transitory computer-readable medium of claim 14, wherein the at least one operational health indicator exists in at least one different region of the provider network.

20. The non-transitory computer-readable medium of claim 14, wherein the provider network comprises a cloud-based network.

* * * * *